(12) United States Patent
Müller et al.

(10) Patent No.: US 7,737,584 B2
(45) Date of Patent: Jun. 15, 2010

(54) ELECTRIC MACHINE

(75) Inventors: Jörg Müller, Nüdlingen (DE); Thomas Then, Bad Neustadt (DE)

(73) Assignee: Siemens Aktiengesellschaft, Munich (DE)

( * ) Notice: Subject to any disclaimer, the term of this patent is extended or adjusted under 35 U.S.C. 154(b) by 259 days.

(21) Appl. No.: 12/067,557

(22) PCT Filed: Aug. 15, 2006

(86) PCT No.: PCT/EP2006/065304

§ 371 (c)(1),
(2), (4) Date: Mar. 20, 2008

(87) PCT Pub. No.: WO2007/033875

PCT Pub. Date: Mar. 29, 2007

(65) Prior Publication Data

US 2008/0252157 A1    Oct. 16, 2008

(30) Foreign Application Priority Data

Sep. 20, 2005  (DE) ................. 10 2005 044 832

(51) Int. Cl.
*H02K 5/20* (2006.01)
*H02K 9/14* (2006.01)
*H02K 9/16* (2006.01)
*H02K 1/20* (2006.01)

(52) U.S. Cl. .................. 310/52; 310/58; 310/59

(58) Field of Classification Search .......... 310/52, 310/54, 58, 59, 64
See application file for complete search history.

(56) References Cited

U.S. PATENT DOCUMENTS 6,200,108 B1   3/2001   Caudill (Continued)

FOREIGN PATENT DOCUMENTS

DE         28 520 A      5/1964

(Continued)

*Primary Examiner*—Quyen Leung
*Assistant Examiner*—Leda Pham
(74) *Attorney, Agent, or Firm*—Henry M. Feiereisen; Ursula B. Day

(57) ABSTRACT

The invention relates to an electric machine (6) comprising a rotor and a stator, the rotor having a shaft (7) and the longitudinal extension of the electric machine (6) being defined by the shaft axis. The electric machine (6) can be cooled by means of a cooling circuit, the latter comprising at least one cooling pipe (3), which extends essentially in the longitudinal direction of the electric machine (6). The cooling circuit comprises a first circular distribution pipe (1) that forms almost a complete circle, which stretches over one plane, the axis of the longitudinal extension of the electric machine (6) being essentially perpendicular to said plane. According to the invention: at least one cooling pipe (3) can be connected in a water-tight manner to the first distribution pipe (1); the cooling circuit can be traversed by a coolant and has a first connection (10), which allows coolant to be supplied to the cooling circuit; and the cooling circuit has a second connection (9), which allows coolant to be evacuated from the cooling circuit. The first distribution pipe (1) is cast in one piece (2) from metal and said piece (2) has openings (4) for the cooling pipes (3) at the connection points of the first distribution pipe (1) to the cooling pipes (3). Once installed, the piece (2) is connected to the housing of the electric machine (6) so that it can conduct heat and/or forms an integral part of the housing.

13 Claims, 4 Drawing Sheets

U.S. PATENT DOCUMENTS

| | | | |
|---|---|---|---|
| 6,943,467 B2 * | 9/2005 | Potoradi et al. | 310/52 |
| 7,569,955 B2 * | 8/2009 | Hassett et al. | 310/54 |
| 7,576,458 B2 * | 8/2009 | Wehner et al. | 310/54 |
| 2003/0048031 A1 | 3/2003 | Dunlap et al. | |

FOREIGN PATENT DOCUMENTS

| | | | |
|---|---|---|---|
| DE | 197 57 605 A1 | 6/1999 |
| DE | 19757605 A1 * | 6/1999 |
| DE | 100 22 146 A1 | 11/2001 |
| DE | 100 05 128 B4 | 3/2004 |
| EP | 1 096 647 A2 | 5/2001 |
| GB | 2 343 060 A | 4/2000 |
| WO | WO 97/44882 A1 | 11/1997 |

* cited by examiner

ELECTRIC MACHINE

BACKGROUND OF THE INVENTION

The invention relates to an electric machine with a rotor and a stator, the rotor having a shaft, and the longitudinal extent of the electric machine being defined by the shaft axis, and the electric machine being capable of being cooled by means of a cooling circuit, the cooling circuit having at least one cooling pipe, which extends substantially in the longitudinal extent of the electric machine, the cooling circuit having a first circular, not quite circumferential distribution pipe, which spans a plane, and the axis of the longitudinal extent of the electric machine being substantially at right angles with respect to this plane, at least one cooling pipe being capable of being tightly connected to the first distribution pipe, it being possible for a coolant to flow through the cooling circuit, the cooling circuit having a first connection, by means of which coolant can be supplied into the cooling circuit, the cooling circuit having a second connection, by means of which coolant can be discharged from the cooling circuit.

Furthermore, the invention relates to a method for producing a cooling circuit of an electric machine.

Electric machines are used in a very large number of technical fields. In the case of electric machines it is necessary to draw a distinction between DC machines, AC machines and three-phase machines. Three-phase machines can be split into three-phase synchronous machines and three-phase asynchronous machines. All of these electric machines contain, inter alia, a stator at rest and a rotatably mounted rotor. All of these electric machines produce waste heat during operation, which waste heat under certain circumstances can destroy the electric machine or reduce its life.

DE 100 05 128 B4 has therefore proposed a stator which can be cooled and which has cooling channels.

One disadvantage, however, is the fact that the distribution channels are formed by large workpieces of the housing, which have corresponding depressions, needing to be mechanically processed and tightly connected to one another, which is comparatively time-consuming and cost-intensive and under certain circumstances has a limited durability.

SUMMARY OF THE INVENTION

The invention is therefore based on the object of specifying an electric machine in which the cooling is optimized and in which the cooling circuit can be produced more easily and more reliably.

This object is achieved according to the invention by virtue of the fact that the first distribution pipe is cast in one part from metal, and the part at the connection points between the first distribution pipe and the cooling pipes has openings for the cooling pipes, the part, in the installed state, being in thermally conductive connection with the housing of the electric machine and/or being part of the housing. The openings can be manufactured by subsequent drilling of the part as far as the first distribution pipe.

This advantageously means that the first distribution pipe does not need to be sealed off in a complex manner since, in contrast to the prior art in DE 100 05 128 B4, it is made from one piece. However, since it is cast in, it achieves additionally stability. The cast piece can in this case be the bearing part of the housing of the electric machine.

Advantageously, the first connection and the second connection are each connected to one end of the first distribution pipe. The coolant is therefore introduced into the first distribution pipe through one connection and discharged via the second connection. The connections are advantageously produced by drilling of the part as far as the first distribution pipe.

An advantageous configuration results if at least one cooling pipe has a partition wall running along the length, with the result that two channels running along the length are produced in one cooling pipe, through which channels coolant can be conducted at the same time in opposite directions. A forward flow and a return flow can therefore be realized by means of, for example, one cooling pipe.

It is further advantageous if a first means is associated with at least one cooling pipe, which first means diverts the coolant flow, which flows away from the first distribution pipe in a first channel, at that end of the cooling pipe which is opposite the first distribution pipe into the second channel of the same cooling pipe, with the result that the coolant flows back in the second channel to the first distribution pipe. The first means can be, for example, a chamber, into which the cooling pipe opens, or a chamber, which is formed in the cooling pipe at the end of the cooling pipe and into which the two channels open, the cooling pipe being closed off at the end.

A further configuration results if at least one cooling pipe has a partition wall, which protrudes beyond the cooling pipe on the side of the first distribution pipe and passes through the first distribution pipe in such a way that the coolant from the first distribution pipe coming from one direction is deflected entirely into the first channel of the cooling pipe and from the second channel of the cooling pipe is deflected back into the first distribution pipe in the original direction.

One configuration of an electric machine according to the invention results by the virtue of the fact that the cooling circuit has a plurality of cooling pipes, which extend substantially in the longitudinal extent of the electric machine, each cooling pipe is tightly connected to the first distribution pipe, each cooling pipe has a partition wall running along the length, with the result that two channels running along the length are produced in one cooling pipe, through which channels coolant can be conducted at the same time in opposite directions, a first means is associated with each cooling pipe, which first means diverts the coolant flow, which flows away from the first distribution pipe in a first channel, at that end of the cooling pipe which is opposite the first distribution pipe into the second channel of the same cooling pipe, with the result that the coolant flows back in the second channel to the first distribution pipe, the first means is a chamber, into which the cooling pipe opens or the first means is a chamber, which is formed in the cooling pipe at the end of the cooling pipe and into which the two channels open, the cooling pipe being closed off at the end, each cooling pipe has a partition wall, which protrudes beyond the cooling pipe on the side of the first distribution pipe and passes through the first distribution pipe in such a way that the coolant from the first distribution pipe coming from one direction is deflected into the first channel of the cooling pipe and from the second channel of the cooling pipe is deflected back into the first distribution pipe in the original direction.

Another advantageous configuration results if the cooling circuit has a second circular, at least partially circumferential distribution pipe, which spans a plane, and the axis of the longitudinal extent of the electric machine is substantially at right angles with respect to this plane, and at least one cooling pipe, which is tightly connected to the first distribution pipe, is also tightly connected to the second distribution pipe.

A deflection means can be associated with at least one cooling pipe on both sides, which deflection means deflects the coolant from a distribution pipe at a connection point into the cooling pipe or deflects the coolant from a cooling pipe in one direction into a distribution pipe.

Advantageously, the means for deflecting the coolant is a baffle, which is arranged at a connection point between a cooling pipe and a distribution pipe in the distribution pipe in such a way that the coolant is deflected from the distribution pipe into the cooling pipe or is deflected from the cooling pipe in a direction of the distribution pipe.

A further advantageous and inventive electric machine results by virtue of the fact that
- the cooling circuit has a plurality of cooling pipes, which extend substantially in the longitudinal extent of the electric machine,
- each cooling pipe is tightly connected to the first distribution pipe,
- the cooling circuit has a second circular, at least partially circumferential distribution pipe, which spans a plane, and the axis of the longitudinal extent of the electric machine is substantially at right angles with respect to this plane, and each cooling pipe is also tightly connected to the second distribution pipe,
- a deflection means is associated with each cooling pipe on both sides, which deflection means deflects the coolant from a distribution pipe at a connection point into a cooling pipe or deflects the coolant from a cooling pipe in one direction into a distribution pipe,
- the means for deflecting the coolant is a baffle, which is arranged at a connection point between a cooling pipe and a distribution pipe in the distribution pipe in such a way that the coolant is deflected from the distribution pipe into the cooling pipe or is deflected from the cooling pipe in a direction of the distribution pipe.

BRIEF DESCRIPTION OF THE DRAWING

The invention and further advantageous configurations of the invention in accordance with the features of the dependent claims will be explained in more detail below with reference to schematically illustrated exemplary embodiments in the drawings, without the invention thereby being restricted to these exemplary embodiments; in the drawings:

DETAILED DESCRIPTION OF PREFERRED EMBODIMENTS

Figure 1:
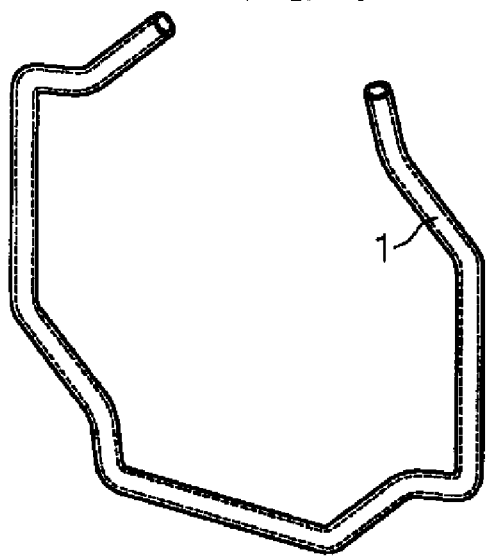
FIG. 1 shows the first distribution pipe.
Figure 2:
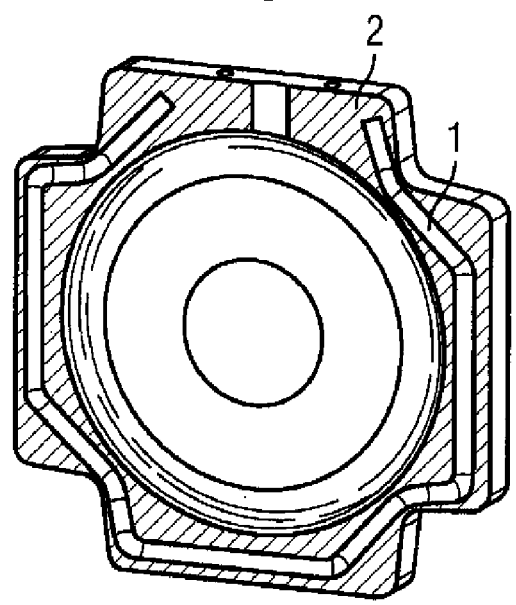
FIG. 2 shows the part with the first distribution pipe.

FIG. 1 shows the first distribution pipe 1, which is cast into a part 2 made of metal. The first distribution pipe is in this case not quite circumferential and is substantially annular. The part 2 is shown in FIG. 2. The first distribution pipe is circular, not quite circumferential and spans a plane. The first distribution pipe does not need to be closed off at the ends since the ends are closed off by the casting process. In this case, the part 2 can also be in the form of a mount plate, with the result that it can accommodate a ball bearing for the shaft of the electric machine.

Figure 3:
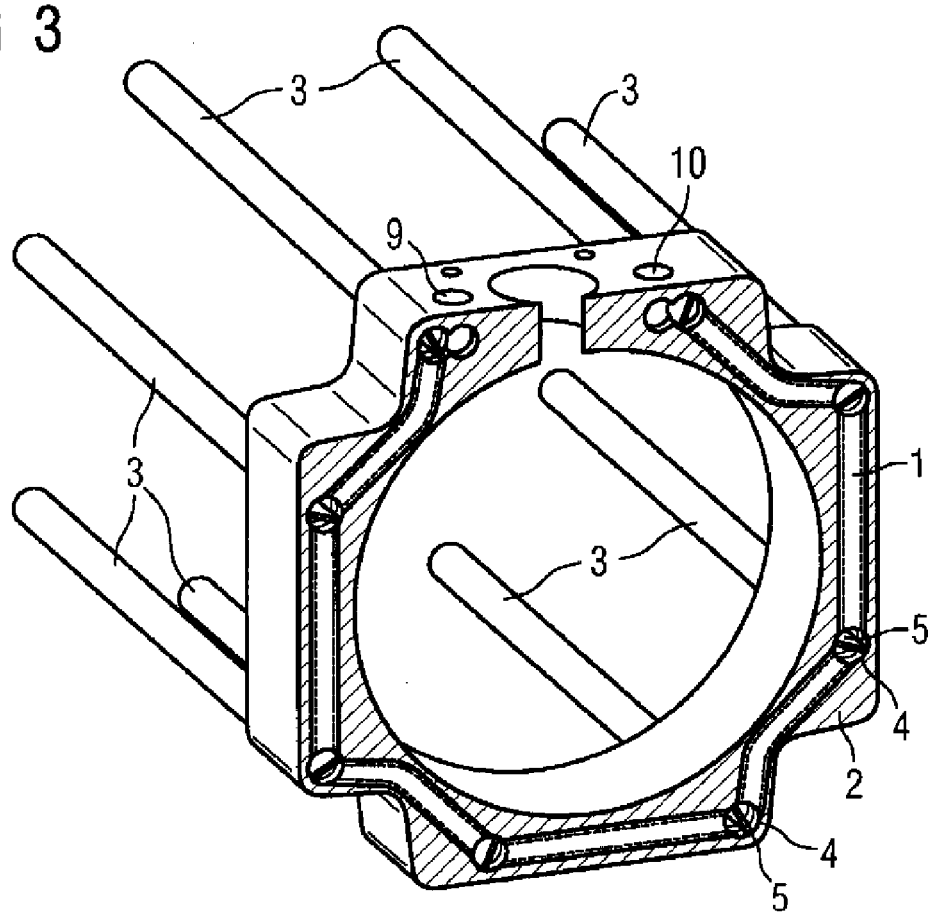
FIG. 3 shows an exemplary embodiment for the cooling circuit.

FIG. 3 shows an exemplary embodiment of the cooling circuit. The cooling circuit comprises, inter alia, the cooling pipes 3 and the part 2, into which the first distribution pipe 1 is cast. The part 2 is drilled at a plurality of points 4 as far as the first distribution pipe 1 in such a way that the cooling pipes 3 can be plugged into the part 2 in a form-fitting manner and can be tightly connected to the first distribution pipe 1. In this exemplary embodiment, the cooling pipes 3 have a partition wall 5, which extends along the length of the cooling pipes 3, with the result that two channels are produced in one cooling pipe 3.

Figure 7:
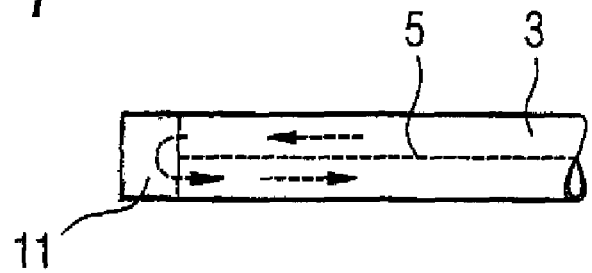
FIG. 7 is a detailed cutaway view of a first variant of a cooling pipe.
Figure 8:
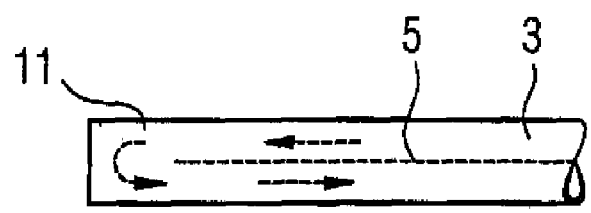
FIG. 8 is a detailed cutaway view of a second variant of a cooling pipe.

The partition wall 5 in the exemplary embodiment shown in FIG. 3 protrudes into the first distribution pipe 1 in such a way that the coolant from the first distribution pipe 1 coming from one direction is deflected entirely into the first channel of the cooling pipe 3 and from the second channel of the cooling pipe 3 is deflected back into the first distribution pipe 1 in the original direction. The deflection of coolant to flow from the first channel into the second channel is realized by formation of a chamber 11 into which the cooling pipe 3 opens, as shown by way of example in FIG. 7. The chamber 11 may be a separate component attached to the open end of the cooling pipe 3, as shown in FIG. 7, or the chamber 11 may be formed in the cooling pipe 3 at the end of the cooling pipe 3, with the two channels opening into the chamber 11, as shown in FIG. 8, whereby the cooling pipe 3 is hereby closed off at the end. The coolant is supplied via a first connection 10 and is diverted by a partition wall 5 into the first channel of the first cooling pipe. At the end of the first channel, the coolant is deflected by the chamber 11 into the second channel and flows back to the first distribution pipe 1, where it is conducted on to the second cooling pipe. If the coolant has flowed through all of the cooling pipes 3, it is discharged through the connection 9. A coolant pump can be provided for the supply and/or discharge processes.

Figure 4:
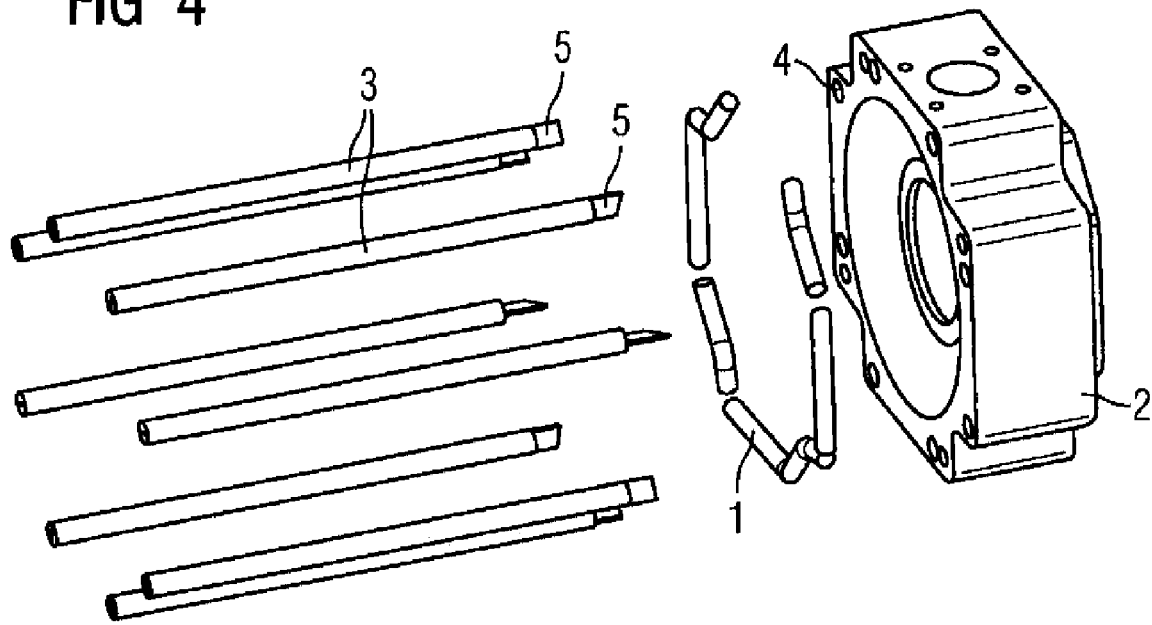
FIG. 4 shows the design of a cooling circuit.

FIG. 4 shows the design of a cooling circuit from FIG. 3. By means of the part 2 being drilled as far as the first distribution pipe 1, parts of the first distribution pipe 1 which are no longer connected to one another can be cast in the part 2. The sealtightness of the cooling circuit is then ensured by the material of the part 2, however, which surrounds the first distribution pipe 1.

Figure 5:
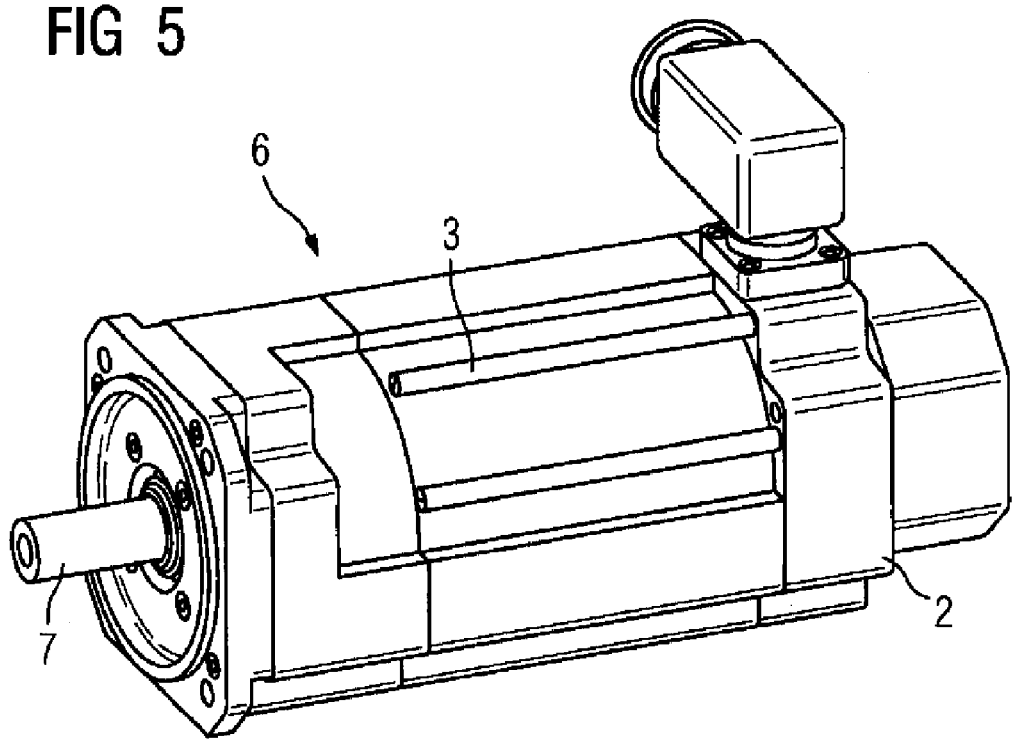
FIG. 5 shows an electric machine according to the invention.

FIG. 5 shows an electric machine according to the invention. It shows, inter alia, the shaft 7 and the part 2 with cooling pipes 3.

Figure 6:
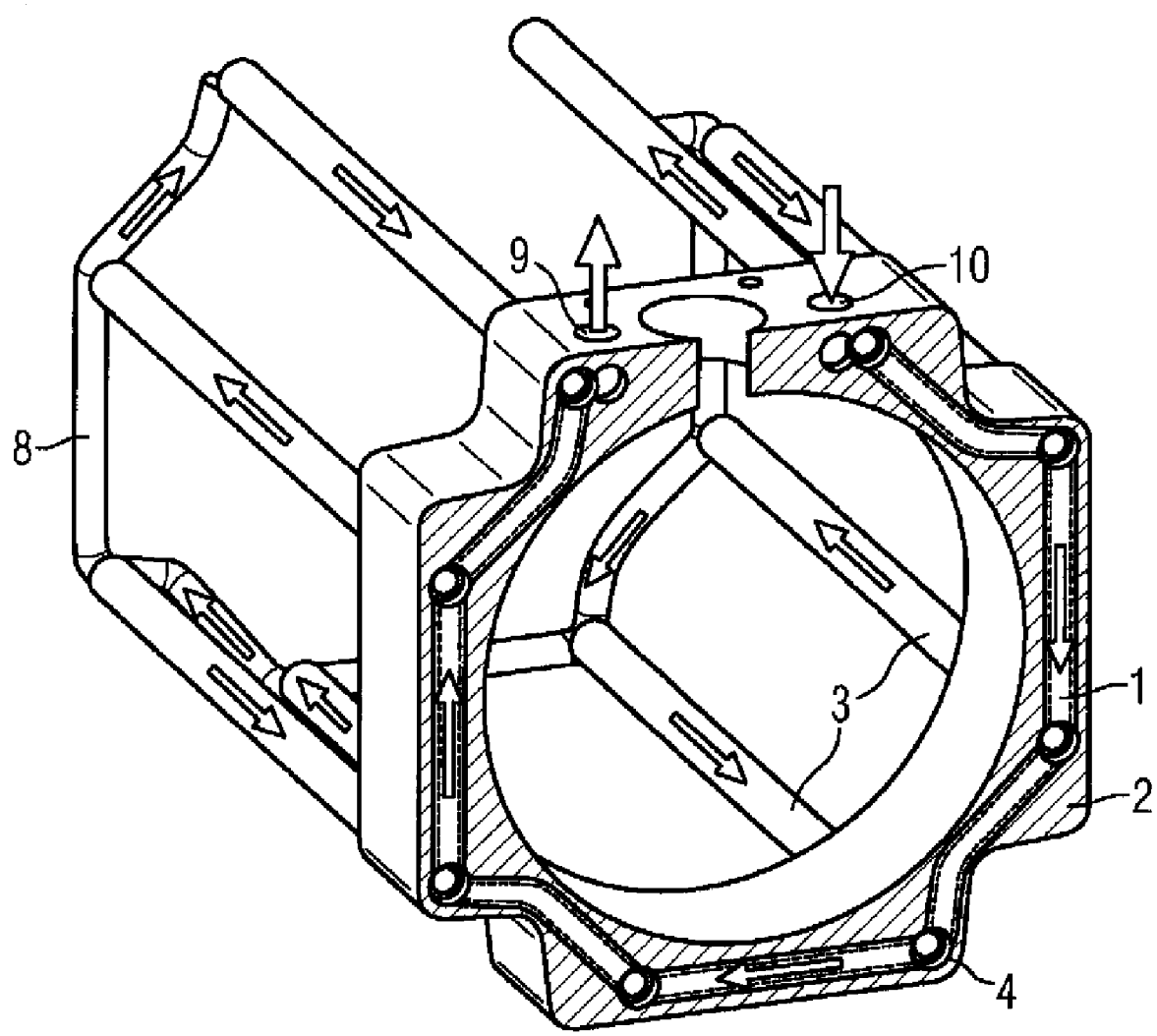
FIG. 6 shows a further exemplary embodiment of the cooling circuit.

FIG. 6 shows a further exemplary embodiment of the cooling circuit. The cooling circuit comprises, inter alia, the cooling pipes 3 and the part 2, into which the first distribution pipe 1 is cast. The part 2 is drilled at a plurality of points 4 as far as the first distribution pipe 1 in such a way that the cooling pipes 3 can be plugged in a form-fitting manner into the part 2 and can be tightly connected to the first distribution pipe 1. The cooling pipes 3 are tightly connected to a second distribution pipe 8 on their other side. The second distribution pipe can in this case be completely circumferential and form a ring or else not quite circumferential, it then being possible for the ends to be closed off, however.

Figure 9:
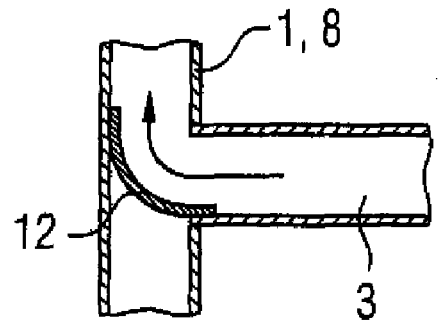
FIG. 9 is a detailed cutaway view of a first variant of a deflection means for deflection of coolant from a cooling pipe into a distribution pipe.
Figure 10:
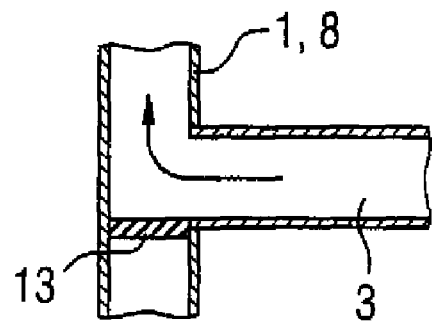
FIG. 10 is a detailed cutaway view of a second variant of a deflection means for deflection of coolant from a cooling pipe into a distribution pipe.

Furthermore, a deflection means is associated with each cooling pipe 3, which deflection means deflects the coolant from a distribution pipe at a connection point into a cooling pipe 3 or deflects the coolant from a cooling pipe 3 in one direction into a distribution pipe. The means can be in the form of a baffle 12, as shown in FIG. 9, a screw, or a rubber stopper 13, as shown in FIG. 10.

The coolant is supplied via a first connection 10 and is diverted by a means into the first cooling pipe 3. At the end of the first cooling pipe 3, the coolant is deflected into the second distribution pipe 8 and flows back to the first distribution pipe 1 via a further cooling pipe 3. Then, the coolant flows through the cooling pipes 3 which follow on from one another in each case in alternating directions. If the coolant has flowed through all of the cooling pipes 3, it is then discharged through the connection 9. A coolant pump can be provided for the supply and/or discharge processes. The arrows in FIG. 6 indicate the flow direction of the coolant.

What is claimed is:

1. An electric machine, comprising:
    a housing;
    a rotor having a shaft defined by a shaft axis to establish a longitudinal extent of the electric machine; and
    a cooling circuit for throughflow of a coolant, said cooling circuit having cooling pipes which extend substantially in the longitudinal extent of the electric machine, said cooling circuit having a first distribution pipe constructed in the form of a breached circle and spanning a plane, with the shaft axis extending substantially perpendicular to the plane, said cooling pipes being tightly connectable to the first distribution pipe, wherein the cooling circuit has a first connection, connected to one end of the first distribution pipe, for supply of coolant into the cooling circuit, and a second connection, connected to another end of the first distribution pipe, for discharge of coolant from the cooling circuit, wherein the first distribution pipe is cast in a metal part which is formed with openings at connection points between the first distribution pipe and the cooling pipes for accepting the cooling pipes, said metal part being in thermally conductive connection with the housing, when installed, and/or being part of the housing,
    wherein each of the cooling pipes has a partition wall along a length thereof to thereby define two channels in each cooling pipe for simultaneous conduction of coolant in opposite directions, and
    wherein each cooling pipe has deflecting means to divet coolant, which flows away from the first distribution pipe in one of the channels, into the other one of the channels at a distribution-pipe-distal end of the cooling pipe to allow coolant to flow back in the other channel to the first distribution pipe.

2. The electric machine of claim 1, wherein the deflecting means is a chamber, into which the cooling pipe opens.

3. The electric machine of claim 1, wherein the deflecting means is a chamber into which the cooling pipe opens at the distribution-pipe-distal end of the cooling pipe.

4. The electric machine of claim 1, wherein the deflecting means is a chamber, which is formed in the cooling pipe at the distribution-pipe-distal end of the cooling pipe and into which the two channels open, with the cooling pipe being closed off at the end.

5. The electric machine of claim 1, wherein the partition wall protrudes beyond the cooling pipe on one side of the first distribution pipe and passes through the first distribution pipe in such a way that coolant is deflected entirely into the one channel of the cooling pipe when approaching the cooling pipe from one direction in the first distribution pipe and is deflected into the other channel of the cooling pipe to flow back into the first distribution pipe and to flow in the first distribution pipe in the same direction.

6. The electric machine of claim 1, wherein the cooling circuit has a second distribution pipe, said cooling pipes having opposite ends, with one end tightly connected to the first distribution pipe and the other end tightly connected to the second distribution pipe.

7. The electric machine of claim 6, wherein the second distribution pipe is shaped in the form of a ring.

8. The electric machine of claim 6, wherein the second distribution pipe is constructed in the form of a breached circle.

9. The electric machine of claim 1, further comprising second deflecting means arranged at a connection point between a cooling pipe and the first distribution pipe for deflecting coolant from the distribution pipe into the cooling pipe or vice versa.

10. The electric machine of claim 9, wherein the second deflecting means is a baffle.

11. The electric machine of claim 9, wherein the second deflecting means is a rubber stopper.

12. A method for producing a cooling circuit of an electric machine, comprising the steps of:
    casting in a metal part a distribution pipe having a configuration in the form of a breached circle, wherein the metal part is placed in the installed state in thermally conductive connection with a housing of the electric machine and/or is part of the housing;
    drilling the metal part to the distribution pipe to provide connection points between the distribution pipe and cooling pipes;
    securing the cooling pipes to the distribution pipe in a tight manner; and
    drilling through the metal part to provide a first connection for fluid communication with one end of the distribution pipe and a second connection for fluid communication with another end of the distribution pipe;
    wherein each cooling pipe has deflecting means to divert coolant so that coolant after flowing away from the distribution pipe is able to flow back to the distribution pipe.

13. The method of claim 12, wherein each of the cooling pipes has a partition wall along a length thereof to thereby define two channels in each cooling pipe so that coolant flows away from the distribution pipe is one of the channels, and is diverted into the other one of the channels at a distribution pipe distal end of the cooling pipe to allow coolant to flow back in the other channel to the distribution pipe.

* * * * *